United States Patent [19]

Teot et al.

[11] Patent Number: 4,615,825

[45] Date of Patent: Oct. 7, 1986

[54] FRICTION REDUCTION USING A VISCOELASTIC SURFACTANT

[75] Inventors: Arthur S. Teot; Gene D. Rose, both of Midland, Mich.; Gregory A. Stevens, Lake Jackson, Tex.

[73] Assignee: The Dow Chemical Company, Midland, Mich.

[21] Appl. No.: 316,467

[22] Filed: Oct. 30, 1981

[51] Int. Cl.$^4$ .............................................. B01F 17/18
[52] U.S. Cl. ............................... 252/356; 71/DIG. 1; 137/13; 252/8.05; 252/34; 252/77; 252/78.1; 252/357; 252/8.51; 406/48
[58] Field of Search ............... 252/356, DIG. 14, 357; 137/13; 406/48

[56] References Cited

U.S. PATENT DOCUMENTS 2,541,816  2/1951  Glarum et al. ................. 544/108 X
3,361,213  1/1968  Savins ............................. 137/13 X

OTHER PUBLICATIONS

Gravsholt: "Viscoelasticity in Highly Dilute Aqueous Solutions of Pure Cationic Detergents", J. of Coll. and Interface Sci., 57(3), pp. 575–577 (1976).

Primary Examiner—Richard D. Lovering

[57] ABSTRACT

The friction exhibited by a flowing aqueous liquid containing a viscoelastic surfactant can be further reduced by adding to the aqueous liquid an organic electrolyte capable of associating with the surfactant ion of the viscoelastic surfactant. For example, the friction exhibited by an aqueous liquid containing cetyl trimethylammonium salicylate can be further reduced by the addition of sodium salicylate to the liquid. The resulting aqueous liquid systems exhibiting the reduced friction are shear stable and useful in a wide variety of applications.

6 Claims, No Drawings

FRICTION REDUCTION USING A VISCOELASTIC SURFACTANT

BACKGROUND OF THE INVENTION

The present invention relates to a method for reducing the friction exhibited by an aqueous liquid during flow and to the aqueous liquid systems having such reduced friction.

In the flow of an aqueous liquid through a conduit, energy is required to overcome the friction created by the turbulence of the liquid flowing through the conduit. In many operations such as industrial applications, particularly those operations in which the velocity of the flowing aqueous liquid exceeds the limit required for smooth laminar flow (e.g., well fracturing treatments or the rapid movement of liquids for considerable distances), substantial expenditures of energy are required to overcome the friction losses. A reduction in the friction loss exhibited by a flowing aqueous liquid would permit lower amounts of energy expenditures and/or increased flow using the same energy.

Heretofore, various alternatives have been proposed to reduce the friction loss exhibited by a flowing aqueous liquid. For example, water-soluble, high molecular weight polymers such as a polymer of a monoalkenyl aromatic sulfonate (e.g., styrene sulfonic acid) or a polymer of a carboxamide (e.g., acrylamide) are known to reduce friction loss when added to an aqueous liquid in small amounts. See, for example, U.S. Pat. Nos. 3,023,760; 3,562,226 and 3,572,354. Unfortunately, the aqueous liquid systems containing the high molecular weight polymers are not shear stable, i.e., the friction reduction exhibited by the liquid containing said polymer is substantially and permanently lost when subjected to high shear.

Friction losses in a flowing aqueous liquid have also been reduced by the addition of a surfactant which imparts viscoelastic properties to the aqueous liquid. For example, U.S. Pat. No. 3,361,213 to Savins teaches that an alkali metal soap of a fatty acid, e.g., sodium oleate, in combination with a strong electrolyte will reduce the friction of an aqueous liquid. Similarly, Savins discloses that (1) an ammonium soap of a fatty acid will reduce the friction losses exhibited by an aqueous liquid containing a weak electrolyte and (2) a substituted ammonium soap of a fatty acid will reduce the friction losses of an aqueous liquid containing no electrolyte. Other viscoelastic surfactants such as 2-naphthol in combination with cetyl trimethyl ammonium bromide are also known to be useful as friction reducing agents. Although such viscoelastic materials often reduce the friction exhibited by an aqueous liquid flowing through a conduit, further reductions in friction over broad flow ranges are often desired, particularly in those operations wherein relatively large amounts of aqueous fluid are to be pumped over long distances.

In view of the aforementioned deficiencies of the prior art, it is highly desirable to further reduce the friction losses exhibited by a flowing aqueous liquid.

SUMMARY OF THE INVENTION

Accordingly, in one aspect, the present invention is a method for reducing the friction caused by an aqueous liquid flowing through a conduit under conditions sufficient to cause nonlaminar flow. By "nonlaminar flow" is meant the flow of a fluid through a conduit at a Reynolds number sufficiently high to cause an increase of the friction factor of the fluid including well-developed turbulent flow. This method comprises passing through a conduit an aqueous liquid containing (1) a surfactant compound having a hydrophobic moiety chemically bonded to an ionic, hydrophilic moiety (hereinafter a surfactant ion) and (2) an organic electrolyte having a moiety that is capable of associating with the surfactant ion to form a viscoelastic surfactant. For the purposes of this invention, a viscoelastic surfactant is a compound having (1) an ion capable of acting as a surfactant and (2) a stoichiometric amount of an organic counterion that associates with the surfactant ion to render it viscoelastic as defined hereinafter. The resulting viscoelastic surfactant is employed in amount sufficient to reduce the friction of the aqueous liquid as it passes through the conduit. The organic electrolyte, which can associate as the counterion with the surfactant ion to form a viscoelastic surfactant, is employed in an amount sufficient to further reduce the friction exhibited by the aqueous liquid containing the viscoelastic surfactant when it passes through the conduit.

In another aspect, the present invention is an aqueous liquid comprising (1) a friction reducing amount of a surfactant compound having a hydrophobic moiety chemically bonded to an ionic, hydrophilic moiety and (2) an organic electrolyte having a moiety that is capable of associating with the surfactant ion to form a viscoelastic surfactant, said organic electrolyte being present in an amount sufficient to further reduce the friction of the aqueous liquid containing the viscoelastic surfactant as it passes through the conduit.

Surprisingly, the presence of the organic electrolyte in an aqueous liquid containing the viscoelastic surfactant in accordance with the practice of this invention significantly further reduces the friction exhibited by the aqueous fluid containing the viscoelastic surfactant as the liquid flows through a conduit. The admixture of the aqueous liquid, organic electrolyte and viscoelastic surfactant is significantly more shear stable than an aqueous liquid containing a polymer capable of providing the aqueous liquid with the same degree of friction reduction. Moreover, the admixture exhibits an unexpectedly large reduction in friction over a wide range of conditions that produce nonlaminar flow.

The method and composition of this invention are useful in those processes where water or other aqueous liquid is pumped or circulated in pipes or other conduits such as in air conditioners and other heat exchangers, slurry pipelines often used to transport coal and various minerals and other operations requiring large amounts of energy for pumping the aqueous liquid.

DETAILED DESCRIPTION OF THE PREFERRED EMBODIMENTS

As used herein, the term "aqueous liquid" refers to those liquids which contain water. Included within the term are aqueous liquids containing inorganic electrolytes, such as aqueous alkaline or aqueous acidic solutions, e.g., an aqueous solution of an alkali metal or alkaline earth metal hydroxide, and aqueous solutions of inorganic salts. Other exemplary aqueous liquids include mixtures of water and a watermiscible liquid such as lower alkanols, e.g., methanol, ethanol or propanol; glycols and polyglycols and the like provided that such water-miscible liquids are employed in amounts that do not deleteriously affect the viscoelastic properties of the aqueous liquid. Also included are aqueous slurries of solid particulates such as coal particles and finely divided mineral ores. In general, however, water and aqueous alkaline, aqueous acidic or aqueous inorganic salt solutions are most beneficially employed as the aqueous liquid herein. Advantageously, the electrolyte concentration is less than about 15, preferably less than about 12, more preferably less than 5, especially less than 1, percent by weight of the solution. Most preferably, the aqueous liquid is water.

The term "viscoelastic" as it applies to liquids, means a viscous liquid having elastic properties, i.e., the liquid at least partially returns to its original form when an applied stress is released. The property of viscoelasticity is well-known in the art and reference is made to H. A. Barnes et al., *Rheol. Acta*, 1975 14, pp. 53–60 and S. Gravsholt, *Journal of Coll. and Interface Sci.*, 57 (3) pp. 575-6 (1976), which are hereby incorporated by reference for a definition of viscoelasticity and tests to determine whether a liquid possesses viscoelastic properties. Of the test methods specified by these references, a test which has been found to be most useful in determining viscoelasticity of an aqueous solution consists of swirling the solution and visually observing whether the bubbles created by the swirling recoil after the swirling is stopped. Any recoil of the bubbles indicates viscoelasticity. Accordingly, a viscoelastic surfactant imparts viscoelasticity to the liquid to which it is added.

In general, surfactant compounds comprise an ionic hydrophobic molecule having an ionic, hydrophilic, moiety chemically bonded to a hydrophobic moiety (herein called a surfactant ion) and a counterion sufficient to satisfy the charge of the surfactant ion. Examples of such surfactant compounds are represented by the formula:

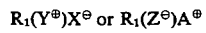

wherein $R_1(Y^\oplus)$ and $R_1(Z^\ominus)$ represent surfactant ions having a hydrophobic moiety represented by $R_1$ and an ionic, solubilizing moiety represented by the cationic moiety $(Y^\oplus)$ or the anionic moiety $(Z^\ominus)$ chemically bonded thereto. $X^\ominus$ and $A^\oplus$ are the counterions associated with the surfactant ions.

In general, the hydrophobic moiety (i.e., $R_1$) of the surfaotant ion is hydrocarbyl or inertly substituted hydrocarbyl wherein the term "inertly substituted" refers to hydrocarbyl radicals having one or more substituent groups, e.g., halo groups such as—Cl or—Br, or chain linkages, such as a silicon linkage (—Si—) which are inert to the aqueous liquid and components contained therein. Typically, the hydrocarbyl radical is an aralkyl group or a long chain alkyl or inertly substituted alkyl, which alkyl groups are generally linear and have at least about 12, advantageously at least about 16, carbon atoms. Representative long chain alkyl groups include dodecyl (lauryl), tetradecyl (myristyl), hexadecyl (cetyl), octadecyl (stearyl) and the derivatives of tallow, coco and soya. Preferred alkyl groups are generally alkyl groups having from about 14 to about 24 carbon atoms, with octadecyl, hexadecyl, erucyl and tetradecyl being the most preferred.

The cationic, hydrophilic moieties (groups), i.e., $(Y^\oplus)$ are generally onium ions wherein the term "onium ions" refers to a cationic group which is essentially completely ionized in water over a wide range of pH, e.g., pH values from about 2 to about 12. Representative onium ions include quaternary ammonium groups, i.e., $-N^\oplus(R)_3$; tertiary sulfonium groups, i.e., $-S^\oplus(R)_2$; quaternary phosphonium groups, i.e., $-P^\oplus(R)_3$ and the like wherein each R is individually a hydrocarbyl or inertly substituted hydrocarbyl. In addition, primary, secondary and tertiary amines, i.e., $-NH_2$, $-NHR$ or $-N(R)_2$, can also be employed as the ionic moiety if the pH of the aqueous liquid being used is such that the amine moieties will exist in ionic form. Of such cationic groups, the surfactant ion of the viscoelastic surfactant is preferably prepared having quaternary ammonium, $-N^\oplus(R)_3$, or tertiary amine, $-N(R)_2$, groups wherein each R is independently an alkyl group or hydroxyalkyl group having from 1 to about 4 carbon atoms, with each R preferably being methyl, ethyl or hydroxyethyl.

Representative anionic, solubilizing moieties (groups) $(Z^\ominus)$ include sulfate groups, i.e. $-OSO_3^\ominus$, sulfonate groups, i.e., $-SO_3^\ominus$, carboxylate groups, i.e., $-COO^\ominus$, phosphonate groups, and phosphonite groups. Of such anionic groups, the surfactant ion of the viscoelastic surfactants is preferably prepared having a carboxylate or sulfate group. For purposes of this invention, such anionic solubilizing moieties are less preferred than cationic moieties.

The counterions (i.e., $X^\ominus$or $A^\oplus$) associated with the surfactant ions are suitably ionically charged, organic materials having ionic character opposite that of the surfactant ion, which combination of counterion and surfactant ion imparts viscoelastic properties to an aqueous liquid. The organic material having an anionic character serves as the counterion for a surfactant ion having a cationic, hydrophilic moiety and the organic material having a cationic character serves as the counterion for the surfactant ion having an anionic, hydrophilic moiety. In general, the preferred counterions exhibiting an anionic character contain a carboxylate, sulfonate or phenoxide group wherein a "phenoxide group" is $ARO^\ominus Ar$ represents an aromatic ring or inertly substituted aromatic ring. Representative of such anionic counterions which, when employed with a cationic surfactant ion, are capable of imparting viscoelastic properties to an aqueous liquid include various aromatic carboxylates such as o-hydroxybenzoate; m- or p-chlorobenzoate, methylene bis-salicylate and 3,4-, 3,5- or 2,4-dichlorobenzoate; aromatic sulfonates such as p-toluene sulfonate and naphthalene sulfonate; phenoxides, particularly substituted phenoxides such as the halogenated phenoxates including 2,6-, 2,5- or 3,5-dichlorophenate, 2,4,5-trichlorophenate or 2,3,5,6-tetrachlorophenate; alkyl substituted phenates such as t-butyl phenate, t-butyl hydroxyphenate and 4-ethyl phenate, and the like. Alternatively, the cationic counterions may contain an onium ion, most preferably a quaternary ammonium group. Representative cationic counterions containing a quaternary ammonium group include benzyl trimethyl ammonium or alkyl trimethyl ammonium wherein the alkyl group is advantageously octyl, decyl, dodecyl and the like. The use of a cation as the counterion is generally less preferred than the use of an anion as the counterion.

The particular surfactant ion, and the counterion associated therewith are selected such that the combination imparts viscoelastic properties to an aqueous liquid. Of the aforementioned surfactant ions and counterions, those combinations which form such viscoelastic surfactants will vary and are easily determined by the test methods hereinbefore described. Of the surfactants which impart viscoelastic properties to an aqueous liquid, the preferred surfactant compounds include those represented by the formula:

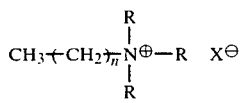

wherein n is an integer from about 13 to about 23, preferably an integer from about 15 to about 19; each R is independently hydrogen or an alkyl group or a hydroxyalkyl group having from 1 to 4 carbon atoms, preferably each R is independently methyl or ethyl and $X^{\ominus}$ is o-hydroxy benzoate, m- or p-halobenzoate or m- or p-alkylbenzoate wherein the alkyl group is advantageously from 1 to about 4 carbon atoms.

The viscoelastic surfactants are easily prepared by admixing the basic form of the desired cationic surfactant ion (or acidic form of the desired anionic surfactant ion) with a stoichiometric amount of the acidic form of the desired cationic counterion (or basic form of the desired anionic counterion). Alternatively, stoichiometric amounts of the salts of the cationic surfactant ion and the anionic counterion (or equimolar amounts of the anionic surfactant ion and cationic counterion) can be admixed to form the viscoelastic surfactant. See, for example, the procedures described in U.S. Pat. No. 2,541,816.

The viscoelastic surfactant is employed in an amount sufficient to impart viscoelastic properties to the aqueous liquid, wherein the viscoelasticity of the aqueous liquid is measured by the techniques described herein. In general, such amount of viscoelastic surfactant is sufficient to measurably reduce, preferably by at least 5 percent, the friction exhibited by the aqueous liquid as the liquid flows through a conduit under conditions sufficient to provide nonlaminar flow. For the purposes of this invention, the friction exhibited by the flowing aqueous liquid is measured using conventional techniques such as set forth in Example 1. The specific viscoelastic surfactant employed and the concentration thereof in the aqueous liquid are dependent on a variety of factors including solution composition, temperature, and shear rate to which the flowing liquid will be subjected. In general, the concentration of any specific viscoelastic surfactant most advantageously employed herein is easily determined by experimentation. In general, the viscoelastic surfactants are preferably employed in amounts ranging from about 0.01 to about 5 weight percent based on the weight of the surfactant and aqueous liquid. The viscoelastic surfactant is more preferably employed in amounts from about 0.05 to about 0.5 percent based on the weight of the aqueous liquid and the viscoelastic surfactant.

In the practice of this invention, an organic electrolyte having an ionic character opposite to that of the surfactant ion and capable of being associated as an organic counterion with said surfactant ion is employed to further reduce the friction exhibited by the aqueous liquid containing the viscoelastic surfactant as it passes through a conduit under conditions of nonlaminar flow. Such organic electrolytes suitably employed herein include those containing organic ions which, when associated with the surfactant ions of the surfactant compound, form a viscoelastic surfactant. The organic electrolyte, when present in an excess of that which associates with the surfactant ion, is capable of further reducing friction of the aqueous liquid passing through the conduit. Such organic electrolyte is soluble in the aqueous liquid containing the viscoelastic surfactant.

In general, the organic ions are formed by the dissociation of corresponding organic electrolytes, including salts and acids or bases of a suitable organic ion, for example, an organic electrolyte which, upon dissociation, forms an anion which will further reduce the friction of an aqueous liquid containing a viscoelastic surfactant having a cationic surfactant ion. Examples of such anionic organic electrolytes include the alkali metal salts of various aromatic carboxylates such as the alkali metal aromatic carboxylates, e.g., sodium salicylate and potassium salicylate and disodium methylene-bis(salicylate); alkali metal ar-halobenzoates, e.g., sodium p-chlorobenzoate, potassium m-chlorobenzoate, sodium 2,4-dichlorobenzoate and potassium 3,5-dichlorobenzoate; aromatic sulfonic acids such as p-toluene sulfonic acid and the alkali metal salts thereof; napthalene sulfonic acid; phenols and substituted phenols, e.g., ar,ar-dichlorophenols, 2,4,5-trichlorphenol, t-butylphenol, t-butylhydroxyphenol, ethylphenol and the like.

A cationic organic electrolyte which, upon dissociation, forms a cation useful in further reducing the friction of an aqueous liquid containing a viscoelastic surfactant having an anionic surfactant ion. While cationic organic electrolytes are less preferred than the aforementioned anionic organic electrolytes, examples of suitable cationic electrolytes include the quaternary ammonium salts such as alkyl trimethylammonium halides and alkyl triethylammonium halides wherein the alkyl group advantageously contains 4 to 10 carbons and the halide advantageously is chloride; aryl and aralkyl trimethyl ammonium halides such as phenyl trimethyl and benzyl trimethyl ammonium chloride; alkyl trimethyl phosphonium halides and the like. Preferably, the organic electrolyte is the same or generates the same ion associated with the surfactant ion of the viscoelastic surfactant contained by the aqueous liquid, e.g., alkali metal salicylate is advantageously employed as the additional organic electrolyte when the viscoelastic surfactant is originally prepared having a salicylate counterion. Therefore, the most preferred organic electrolytes are the alkali metal salts of an aromatic carboxylate, for example, sodium salicylate.

In the practice of this invention, sufficient amounts of the organic electrolyte are employed to further reduce the friction exhibited by the aqueous liquid containing the viscoelastic surfactant as it passes through a conduit. The friction of the aqueous liquid is that friction as measured using the test method set forth in Example 1. By "reduce the friction" is meant that, by test method described in Example 1, the friction of an aqueous liquid containing the viscoelastic surfactant and the organic electrolyte (i.e., the aqueous liquid containing a number of suitable organic ions in excess of that number required to fully balance the charge of the surfactant ion) is less than the friction exhibited by an aqueous liquid having an identical concentration of the viscoelastic surfactant but containing no additional organic electrolyte. Preferably, the organic electrolyte is employed in amounts such that, when the flow characteristics as defined by the Reynolds number are constant, the friction exhibited by the flowing aqueous liquid containing the viscoelastic surfactant and organic electrolyte is at least about 5, more preferably at least about 10, percent less than an aqueous liquid that is identical in all respects except that it contains no excess organic ions. The Reynolds number is the product of the density ($\rho$) of the aqueous liquid expressed in grams per cubic centimeter (g/cm³), the mean velocity (v) of the liquid flowing through the conduit expressed in centimeters per second (cm/sec) and the diameter (d) of the conduit expressed in centimeters (cm) divided by the viscosity (μ) (poise) of the aqueous liquid, i.e., Re = (ρvd)/μ.

In general, as the flow characteristic of an aqueous liquid changes such that the Re increases, the friction exhibited by the flowing liquid decreases until the flow becomes nonlaminar as defined hereinbefore. Advantageously, the concentration of the organic ions which produces the desired further reduction in friction is such that the Re, at which this decrease in friction occurs, is increased. The aqueous liquid contains sufficient amounts of the organic electrolyte such that the level of friction at nonlaminar flow is reduced. This level of friction monotonically decreases with increasing Re to Re greater than those aqueous liquids containing n organic electrolyte.

The concentration of organic electrolyte required in the aqueous liquid to impart such further reduction in friction is dependent on a variety of factors including the particular aqueous liquid, viscoelastic surfactant and organic electrolyte employed and the achieved reduction in friction. In general, the concentration of the organic electrolyte will advantageously range from about 0.1 to about 20, preferably from about 1 to about 5, moles per mole of the viscoelastic surfactant.

The aqueous liquids having reduced friction when passing through a conduit are readily prepared by admixing the desired amounts of the viscoelastic surfactant and organic electrolyte to form an aqueous liquid solution. The resulting solution, which solutions are stable and can be stored for long periods, can be employed as prepared for various purposes such as in fire fighting systems, industrial processing, in operations such as heat exchange and air conditioning, as a carrier in transporting coal slurries and other minerals and the like. In addition, other optional ingredients can be added to the aqueous liquid to render the liquid suitable for various applications such as fracturing fluids, drilling muds, agricultural sprays and cutting fluids.

The following examples are presented to illustrate the invention and should not be construed to limit its scope. All percentages and parts are by weight unless otherwise indicated.

EXAMPLE 1

A composition (Sample No. 1) is prepared by admixing 99.5 parts of water, 0.25 part of a viscoelastic surfactant of cetyltrimethylammonium salicylate (prepared using equimolar amounts of cetyltrimethylammonium hydroxide and salicylic acid) and 0.27 part of sodium salicylate. To determine the friction exhibited by the resulting solution flowing through a conduit, the velocity of the liquid as it flows through a length of a conduit at a known pressure drop is measured using an apparatus comprising a suitably sized reservoir for holding the aqueous liquid, said reservoir being connected to a circular conduit constructed of glass and having an inside diameter of 2.65 mm and a length of 100 cm. The reservoir is fitted such that a predetermined pressure can be applied to any liquid contained therein and maintained constant throughout the time required for the desired amounts of liquid to flow the length of the circular conduit. The other end of the circular conduit is connected to a graduated receptacle which is maintained at atmospheric pressure. In operation, while maintaining the pressure on the aqueous liquid constant, the liquid is allowed to flow through the circular conduit using the applied pressure as a driving force. The liquid flowing through the conduit is collected in the receptacle and the mean velocity of the liquid in the conduit is determined by measuring the amount of liquid collected and dividing by the time required to collect the liquid.

In this example, separate portions of Sample No. 1 are passed through the circular conduit using the various pressures specified in Table I. These pressures resulted in various mean velocities of the liquid in the circular conduit, which velocities are specified in Table I. From the predetermined pressures and measured velocities, a friction factor is calculated using the equation:

$$f = \frac{D \Delta P 2g}{4 \rho L V^2}$$

wherein:
f = Fanning friction factor
D = diameter of the circular conduit through which the liquid is passed, expressed in cm (0.265 cm)
ΔP = pressure drop of the liquid as it flows through the circular conduit in g/cm²
g = 980.6 cm/sec²
ρ = density of aqueous liquid in g/cm³ (~1 g/cm³)
L = length of conduit through which liquid flows in cm (100 cm)
V = velocity of liquid in cm/sec In a similar manner, the friction of water (Sample No. C-1) and water containing 0.25 weight percent cetyl trimethylammonium salicylate with no additional sodium salicylate (organic electrolyte) (Sample No. C-2) are determined. The results of the testing are also recorded in Table I.

TABLE I

| Sample No. | Viscoelastic Surfactant[1] Type | Conc. | Organic Electrolyte[2] Type | Conc. | Pressure Drop (ΔP), g/cm² | Velocity (V) cm/sec | Re[3] | Friction Factor (f)[4] |
|---|---|---|---|---|---|---|---|---|
| 1 | CTAS | 0.25 | NaS | 0.27 | 366 | 273.8 | 7,260 | 0.0063 |
|  |  |  |  |  | 1,392 | 659.0 | 17,460 | 0.0042 |
|  |  |  |  |  | 2,742 | 1028.0 | 27,230 | 0.0034 |
| C-1* | — | — | — | — | 436 | 229.0 | 6,060 | 0.0108 |
|  |  |  |  |  | 1,748 | 505.0 | 13,390 | 0.0090 |
|  |  |  |  |  | 2,784 | 656.0 | 17,400 | 0.0084 |
| C-2* | CTAS | 0.25 | — | — | 562 | 351.1 | 9,300 | 0.0060 |
|  |  |  |  |  | 1,392 | 556.5 | 14,750 | 0.0058 |

TABLE I-continued

| Sample No. | Viscoelastic Surfactant[1] Type | Conc. | Organic Electrolyte[2] Type | Conc. | Pressure Drop (ΔP), g/cm² | Velocity (V) cm/sec | Re[3] | Friction Factor (f)[4] |
|---|---|---|---|---|---|---|---|---|
| | | | | | 2,777 | 701.1 | 18,580 | 0.0073 |

*Not an example of the present invention.
[1]The type of viscoelastic surfactant is given in abbreviated form wherein CTAS is cetyltrimethylammonium salicylate. The concentration of the surfactant is expressed as weight percent based on the weight of the water and surfactant.
[2]The type of electrolyte is given in abbreviated form with NaS being sodium salicylate. The concentration of the counterion is expressed as weight percent based on the weight of water, surfactant and counterion.
[3]Reynolds Number.
[4]Test described in this Example 1.

As evidenced by Table I, the aqueous liquid composition containing excess amounts of the organic electrolyte exhibits lower friction than water (Sample No. C-1) or water containing only the viscoelastic surfactant (Sample No. C-2). In addition, the aqueous liquid containing only the viscoelastic surfactant (Sample No. C-2) shows increased friction at a Re of between 14,750 and 18,580 and water (Sample No. C-1) shows a similar increase in friction at a Re of about 2,300, which increase in friction indicates the onset of nonlaminar flow. Unexpectedly, at Re up to 27,230, the aqueous liquid containing both the viscoelastic surfactant and excess amounts of the organic electrolyte exhibit no such increase in friction.

In addition, an aqueous liquid composition identical in all respects to Sample No. 1 is sheared for two minutes at high speed in a Waring Blendor and the friction remeasured using the same pressures. The sheared composition is found to exhibit the same friction as Sample No. 1, thereby indicating that the compositions of the invention are shear stable.

For purposes of comparison, an aqueous liquid containing 0.0125 weight percent of a partially hydrolyzed acrylamide polymer having a weight average molecular number of 3–4 million (calculated from viscosity) is tested in a similar manner and found to exhibit essentially the same friction at equivalent Re as Sample No. 1. However, after shearing the aqueous liquid at high speed in a Waring Blendor for 2 minutes, the friction exhibited by the aqueous liquid is significantly increased, e.g, the aqueous liquid subjected to shear and having flow characteristics defined by a Re of about 19,000 has a friction of about 0.068 whereas the aqueous liquid which has not been sheared exhibits a friction of only about 0.037 at flow characteristics defined by the same Re.

EXAMPLE 2

Following the procedures of Example 1, the friction of aqueous liquid compositions (Samples Nos. 2–4) containing 99.8 parts of water, 0.1 part of cetyltrimethylammonium salicylate and the various amounts of sodium salicylate specified in Table II are measured at the various Re specified in Table II. For purposes of comparison, the friction values of water (Sample No. C-1) and an aqueous liquid composition of 99.9 parts of water and 0.1 part of cetyl trimethylammonium salicylate (Sample No. C-3) are determined at the Re specified in Table II.

TABLE II

| Sample No. | Viscoelastic Surfactant[1] Type | Conc. | Organic Electrolyte[2] Type | Conc. | Re[3] | Friction Factor (f)[4] |
|---|---|---|---|---|---|---|
| 2 | CTAS | 0.1 | NaS | 0.022 | 4,500 | 0.0066 |
| | | | | | 7,800 | 0.0076 |
| | | | | | 19,000 | 0.0072 |
| 3 | CTAS | 0.1 | NaS | 0.044 | 3,700 | 0.0086 |
| | | | | | 8,800 | 0.0060 |
| | | | | | 15,700 | 0.0064 |
| 4 | CTAS | 0.1 | NaS | 0.066 | 3,900 | 0.0080 |
| | | | | | 7,600 | 0.0058 |
| | | | | | 21,000 | 0.0056 |
| C-1* | — | — | — | — | 3,500 | 0.0115 |
| | | | | | 9,200 | 0.0102 |
| | | | | | 19,000 | 0.0084 |
| C-3* | CTAS | 0.1 | — | — | 4,000 | 0.0075 |
| | | | | | 7,000 | 0.0089 |
| | | | | | 19,000 | 0.0072 |

*Not an example of the present invention.
[1]Same as (1) in Table I.
[2]Same as (2) in Table I.
[3]Same as (3) in Table I.
[4]Same as (4) in Table I.

As evidenced by the data in Table II, the concentration of the organic electrolyte affects the friction exhibited by the aqueous liquid containing the same. Generally, greater reduction in friction is evidenced with increasing concentrations of organic electrolyte up to a maximum.

For comparison purposes, an aqueous liquid containing the viscoelastic surfactant and potassium chloride, an inorganic electrolyte, with the Cl⊖ being capable of acting as the counterion for the cetyl trimethylammonium radical, is prepared. Although results equivalent to those obtained using an organic electrolyte of sodium salicylate can be achieved, a relatively high concentration of about 0.5 weight percent KCl, based on the weight of the water and viscoelastic surfactant, is required.

EXAMPLE 3

Following the procedures of Example 1, the friction of aqueous liquid compositions (Sample Nos. 5–7) containing 99.8 parts of water, 0.1 part of tetradecyl trimethylammonium salicylate and the various amounts of sodium salicylate specified in Table III are measured at the various Re specified in Table III.

For purposes of comparison, the friction values of water (Sample No. C-1) and an aqueous liquid composition of 99.9 parts of water and 0.1 part of tetradecyl trimethylammonium salicylate (Sample No. C-4) are determined at the Re specified in Table III. The results of these determinations are reported in Table III.

TABLE III

| Sample No. | Viscoelastic Surfactant[1] Type | Conc. | Organic Electrolyte[2] Type | Conc. | Re[3] | Friction Factor (f)[4] |
|---|---|---|---|---|---|---|
| 5 | MTAS | 0.25 | NaS | 0.15 | 6,414 | 0.0078 |
| | | | | | 16,017 | 0.0038 |
| | | | | | 21,623 | 0.0034 |

TABLE III-continued

| Sample No. | Viscoelastic Surfactant[1] Type | Conc. | Organic Electrolyte[2] Type | Conc. | Re[3] | Friction Factor (f)[4] |
|---|---|---|---|---|---|---|
| | | | | | 25,467 | 0.004 |
| 6 | MTAS | 0.25 | NaS | 0.30 | 6,407 | 0.0078 |
| | | | | | 15,489 | 0.0040 |
| | | | | | 20,925 | 0.0037 |
| | | | | | 27,681 | 0.0034 |
| 7 | MTAS | 0.25 | NaS | 0.50 | 6,072 | 0.0087 |
| | | | | | 15,401 | 0.0041 |
| | | | | | 21,890 | 0.0033 |
| | | | | | 28,350 | 0.0031 |
| | | | | | 33,086 | 0.0028 |
| C-1* | — | — | — | — | 3,500 | 0.0115 |
| | | | | | 9,200 | 0.0102 |
| | | | | | 19,000 | 0.0084 |
| C-4* | MTAS | 0.25 | — | — | 7,704 | 0.0054 |
| | | | | | 14,682 | 0.0045 |
| | | | | | 20,121 | 0.0040 |
| | | | | | 22,738 | 0.0047 |

*Not an example of the present invention.
[1]MTAS is tetradecyl trimethylammonium salicylate. Otherwise (1) is the same as (1) in Table I.
[2]Same as (2) in Table I.
[3]Same as (3) in Table I.
[4]Same as (4) in Table I.

As evidenced by the data of Table III, the relationship of friction to the addition of organic electolyte to an aqueous liquid containing a viscoelastic surfactant is similar to that shown in Tables I and II.

EXAMPLE 4

Following the procedures of Example 1, the friction of aqueous liquid compositions (Sample Nos. 8-14) containing 99.8 parts of water, 0.1 part of cetyl trimethylammonium salicylate or cetyl trimethylammonium 3,4-dichlorobenzoate and the various amounts of sodium salicylate and sodium 3,4-dichlorobenzoate specified in Table IV are measured at the various Re specified in Table IV.

For purposes of comparison, the friction values of water (Sample No. C-1) and an aqueous liquid composition of 99.9 parts of water and 0.1 part of cetyl trimethylammonium salicylate or cetyl trimethylammonium 3,4-dichlorobenzoate (Sample No. C-6) are determined at the Re specified in Table IV. The results of these determinations are reported in Table IV.

TABLE IV

| Sample No. | Viscoelastic Surfactant[1] Type | Conc. | Organic Electrolyte[2] Type | Conc. | Re[3] | Friction Factor (f)[4] |
|---|---|---|---|---|---|---|
| 8 | CTAS | 0.15 | NaS | 0.3 | 7,580 | 0.0056 |
| | | | | | 15,906 | 0.0038 |
| | | | | | 21,398 | 0.0035 |
| | | | | | 26,058 | 0.0038 |
| 9 | CTAS | 0.15 | NaS | 0.4 | 7,208 | 0.0062 |
| | | | | | 16,408 | 0.0036 |
| | | | | | 21,313 | 0.0035 |
| | | | | | 27,329 | 0.0034 |
| 10 | CTAS | 0.15 | NaS | 0.5 | 7,524 | 0.0057 |
| | | | | | 16,441 | 0.0036 |
| | | | | | 21,356 | 0.0035 |
| | | | | | 25,411 | 0.0040 |
| 11 | CTAS | 0.15 | NaS | 0.6 | 7,572 | 0.0056 |
| | | | | | 16,115 | 0.0037 |
| | | | | | 21,623 | 0.0034 |
| | | | | | 24,487 | 0.0043 |
| C-5* | CTAS | 0.15 | — | — | 7,785 | 0.0053 |
| | | | | | 15,430 | 0.0040 |
| | | | | | 19,632 | 0.0042 |
| | | | | | 20,895 | 0.0059 |
| 12 | CTADCB | 0.25 | NaDCB | 0.2 | 4,557 | 0.0155 |
| | | | + 1 drop | | 15,086 | 0.0042 |
| 13 | CTADCB | 0.25 | 50% NaOH NaDCB | 0.4 | 21,222 | 0.0036 |
| | | | | | 28,940 | 0.0031 |
| | | | | | 5,072 | 0.0125 |
| | | | | | 15,044 | 0.0043 |
| | | | | | 20,150 | 0.0040 |
| | | | | | 26,275 | 0.0037 |
| 14 | CTADCB | 0.25 | NaDCB | 1.0 | 6,473 | 0.0077 |
| | | | | | 14,587 | 0.0045 |
| | | | | | 20,181 | 0.0039 |
| | | | | | 22,246 | 0.0052 |
| C-6* | CTADCB | 0.25 | — | — | 6,181 | 0.0084 |
| | | | | | 15,289 | 0.0041 |
| | | | | | 21,022 | 0.0036 |
| | | | | | 26,524 | 0.0036 |
| C-1* | — | — | — | — | 3,500 | 0.0115 |
| | | | | | 9,200 | 0.0102 |
| | | | | | 19,000 | 0.0084 |

*Not an example of the present invention.
[1]CTAS — cetyl trimethylammonium salicylate. CTADCB — cetyl trimethylammonium 3,4-dichlorobenzoate Otherwise (1) is the same as (1) in Table I.
[2]NaS — sodium salicylate. NaDCB — sodium 3,4-dichlorobenzoate. Otherwise (2) is the same as (2) in Table I.
[3]Same as (3) in Table I.
[4]Same as (4) in Table I.

EXAMPLE 4

Following the procedures of Example 1, the friction of aqueous compositions containing ~79 parts of water, 20 parts of ethylene glycol, 0.25 part of cetyl trimethylammonium salicylate (CTAS) and various amounts of sodium salicylate as specified in Table V are measured at the various Re specified in Table V.

For purposes of comparison, the friction values of an aqueous composition of 79.75 parts of water, 20 parts of ethylene glycol and 0.25 part of CTAS (Sample No. C-7) are determined at the Re specified in Table V. The results of these determinations are reported in Table V.

TABLE V

| Sample No. | Viscoelastic Surfactant[1] Type | Conc. | Organic Electrolyte[2] Type | Conc. | Re[3] | Friction Factor (f)[4] |
|---|---|---|---|---|---|---|
| 15 | CTAS | 0.25 | NaS | 0.2 | 1,150 | 0.0374 |
| | | | | | 3,490 | 0.0105 |
| | | | | | 8,330 | 0.0055 |
| | | | | | 12,100 | 0.0054 |
| | | | | | 13,700 | 0.0055 |
| 16 | CTAS | 0.25 | NaS | 0.3 | 872 | 0.0652 |
| | | | | | 3,160 | 0.0128 |
| | | | | | 8,780 | 0.0050 |
| | | | | | 13,000 | 0.0035 |
| | | | | | 15,000 | 0.0046 |
| 17 | CTAS | 0.25 | NaS | 0.5 | 935 | 0.0560 |
| | | | | | 3,270 | 0.0120 |
| | | | | | 8,450 | 0.0054 |
| | | | | | 11,300 | 0.0050 |
| | | | | | 14,600 | 0.0048 |
| 18 | CTAS | 0.25 | NaS | 1.0 | 1,140 | 0.0378 |
| | | | | | 3,330 | 0.0116 |
| | | | | | 8,930 | 0.0048 |
| | | | | | 12,400 | 0.0042 |
| | | | | | 14,400 | 0.0049 |
| C-7* | CTAS | 0.25 | — | — | 912 | 0.0280 |
| | | | | | 3,790 | 0.0089 |
| | | | | | 6,050 | 0.0105 |
| | | | | | 7,810 | 0.0105 |

TABLE V-continued

| Sample No. | Viscoelastic Surfactant[1] Type | Conc. | Organic Electrolyte[2] Type | Conc. | Re[3] | Friction Factor (f)[4] |
|---|---|---|---|---|---|---|
| | | | | | 10,600 | 0.0103 |

*Not an example of the present invention.
[1]Same as (1) in Table I.
[2]Same as (2) in Table I.
[3]Same as (3) in Table I.
[4]Same as (4) in Table I.

What is claimed is:

1. An aqueous liquid composition comprising (1) an aqueous liquid, (2) a friction reducing amount of a viscoelastic cationic surfactant having (a) a cationic surfactant ion and (b) an organic ion associated as a counterion with the cationic surfactant ion and (3) additional organic ions (i) having a charge opposite to that of the cationic surfactant ion and (ii) being capable of associating with the cationic surfactant ion to form a viscoelastic cationic surfactant, said additional organic ions being present in an amount sufficient to further reduce the friction exhibited by the aqueous liquid containing the viscoelastic cationic surfactant as the aqueous liquid passes through a conduit under conditions of nonlaminar flow.

2. The composition of claim 1 wherein the viscoelastic surfactant is cetyl trimethylammonium salicylate or tetradecyl trimethylammonium salicylate and the organic electrolyte is sodium salicylate.

3. The composition of claim 2 wherein the aqueous liquid contains up to 20 weight percent of ethylene glycol.

4. The composition of claim 1 wherein the viscoelastic surfactant is cetyl trimethylammonium 3,4-dichlorobenzoate and the organic electrolyte is sodium 3,4-dichlorobezoate.

5. The composition of claim 2 or 4 wherein the composition contains from about 0.05 to about 0.5 weight percent of the viscoelastic surfactant and from about 1 to about 5 moles of organic electrolyte per mole of the viscoelastic surfactant.

6. The composition of claim 1 wherein the surfactant compound is cetyl trimethylammonium chloride or cetyl trimethylammonium salicylate and the organic electrolyte is sodium salicylate.

* * * * *

UNITED STATES PATENT AND TRADEMARK OFFICE
CERTIFICATE OF CORRECTION

PATENT NO. : 4,615,825

DATED : October 7, 1986

INVENTOR(S) : Arthur S. Teot, Gene D. Rose and Gregory A. Stevens

It is certified that error appears in the above-identified patent and that said Letters Patent is hereby corrected as shown below:

Column 2, line 14, "in amount" should be --in an amount--.

Column 2, line 63, "watermiscible" should be --water-miscible--.

Column 3, line 43, "surfaotant" should be --surfactant--.

Column 4, line 35, "ARO⊖Ar" should be --ArO$^{\ominus}$ and Ar--.

Column 7, line 17, "containing n" should be --containing no--.

Column 10, line 26, Table II, "7,000" should be --7,100--.

Column 9, second footnote, Table I-continued, "couterion" should be --counterion--.

Column 9, line 66, Table II, column Conc., "01" should be --0.1--.

Column 14, line 13, "dichlorobezoate" should be --dichlorobenzoate--.

Signed and Sealed this

Eleventh Day of July, 1989

Attest:

DONALD J. QUIGG

Attesting Officer

Commissioner of Patents and Trademarks